(12) United States Patent
Choi

(10) Patent No.: US 6,424,341 B2
(45) Date of Patent: *Jul. 23, 2002

(54) DEVICE FOR AND METHOD OF CONTROLLING OSD IN MUTING VIDEO SIGNALS

(75) Inventor: Chun-Geun Choi, Kyungki-do (KR)

(73) Assignee: Samsung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,404

(22) Filed: Jul. 2, 1998

(30) Foreign Application Priority Data

Jul. 2, 1997 (KR) .......................................... 97-30537

(51) Int. Cl.[7] .................................................. G09G 5/00
(52) U.S. Cl. ....................... 345/204; 345/214; 348/569; 348/632; 348/633; 348/634
(58) Field of Search ................................. 345/204, 214, 345/101, 150, 106, 153, 141, 26; 348/569, 632, 633, 634

(56) References Cited

U.S. PATENT DOCUMENTS

| 5,181,113 | A | * | 1/1993 | Chang | ........................ 348/461 |
|---|---|---|---|---|---|
| 5,493,317 | A | * | 2/1996 | Kim | ............................. 345/213 |
| 5,510,573 | A | * | 4/1996 | Cho et al. | .................... 386/102 |
| 5,629,722 | A | * | 5/1997 | Oh | ............................... 345/141 |
| 5,929,574 | A | * | 7/1999 | Kim et al. | ................... 315/370 |
| 6,006,335 | A | * | 12/1999 | Choi et al. | ................... 713/300 |
| 6,008,861 | A | * | 12/1999 | Chon | ......................... 348/567 |
| 6,025,823 | A | * | 2/2000 | Choi | ............................ 345/101 |

* cited by examiner

Primary Examiner—Bipin Shalwala
Assistant Examiner—Jimmy H. Nguyen
(74) Attorney, Agent, or Firm—Robert E. Bushnell, Esq.

(57) ABSTRACT

A device for controlling an OSD in muting video signals is adapted to eliminate an after-image of the OSD when muting the video signals in a display monitor having an OSD function by use of both hardware and software. The device includes: a microcomputer for generating a cut-off signal to mute the video signals upon sensing a variation in horizontal and vertical sync signals fed thereto by a video card, and for generating a blank signal by executing an OSD erase control program for erasing the OSD; an OSD IC for saving the blank signal in a random access memory (RAM) by means of an OSD erase section when variation in the horizontal and vertical sync signals provided to the microcomputer is sensed, and for generating the blank signal according to an OSD control signal; and a video pre-amplifier and a video main amplifier responsive to the cut-off signal generated by the microcomputer for muting the video signals, and for applying the blank signal to a CRT to erase the OSD displayed thereon.

35 Claims, 5 Drawing Sheets

DEVICE FOR AND METHOD OF CONTROLLING OSD IN MUTING VIDEO SIGNALS

This application makes reference to, incorporates the same herein, and claims all benefits accruing under 35 U.S.C. §119 from my applications entitled METHOD AND APPARATUS FOR CONTROLLING ON SCREEN DISPLAY AT MUTING VIDEO filed in the Korean Industrial Property Office on Jul. 2, 1997 and there duly assigned Ser. No. P97-30537 by that Office.

BACKGROUND OF THE INVENTION

1. Technical Field

The present invention generally relates to a device for and method of controlling an OSD (On Screen Display) in muting video signals. More particularly, the present invention relates to a method of muting video signals without an after-image of the OSD in the state that the OSD is on when abnormal sync signals are provided to a display monitor having an OSD function.

2. Related Art

With developments in the technology of semiconductor fabrication and design, the tendency has been for electrical and electronic applications to employ microcomputers for more convenience in the use of the electronic products. For example, a microcomputer is employed in a display monitor to display data generated by a computer as visual images, and recent display monitors have an OSD function for the convenient use of the microcomputer.

Typically, the internal circuitry of a display monitor includes the following components: a control key section for generating a key signal to adjust the image on the screen; a microcomputer for generating various signals, including OSD data, blank data, and a video mute signal; a horizontal/vertical output circuit section; a video circuit section; and a power supply circuit.

In such a display unit, once the user chooses an OSD function with the control key section, the microcomputer generates OSD data according to the particular OSD function selected. As explained in more detail below, the OSD data are processed and an OSD gain signal is generated.

The OSD gain signal is boosted to a limited level by a video pre-amplifier, also contained in the display unit, and that signal is further amplified in a video main amplifier, after which the amplified signal is displayed on the screen of the display unit.

Typically, it is considered desirable to erase the display by use of a video mute function which occurs as an option when the OSD function is displayed on the screen. In order to erase the OSD on the screen, as well as to mute the video signals, the microcomputer senses a blank data signal and, under software control, the blank data is saved in a random access memory. However, such a method of erasing the OSD has problems. For example, the blank data is provided at a low transmission rate and then saved in the random access memory by means of software. This requires considerable time in erasing the OSD and, as a result, data which is partially non-deleted due to noise in erasing the OSD may be displayed on the screen of the display unit.

Therefore, there is a need for the development of a device and method which is adapted to mute the video signals without occurrence of an after-image of the OSD. Moreover, there is a need for the development of a device for and method of controlling an OSD in muting video signals using both hardware and software.

SUMMARY OF THE INVENTION

Accordingly, an objective of the present invention is to provide a device for and method of controlling an OSD in muting video signals. The device and method are adapted to mute the video signals without an after-image of the OSD by use of both hardware and software.

To achieve these and other advantages and in accordance with the purpose of the present invention, as embodied and broadly described, a device for controlling an OSD in muting video signals includes: a microcomputer for generating a cut-off signal to mute the video signals upon sensing a variation of horizontal and vertical sync signals provided thereto by a video card, and for generating blank data by executing an OSD erase control program for erasing the OSD; an OSD IC for saving the blank data in a RAM by means of an OSD erase section when variation in the horizontal and vertical sync signals provided to the microcomputer is sensed, and for generating the blank data according to an OSD control signal; and a video pre-amplifier and a video main amplifier responsive to the cut-off signal generated by the microcomputer for muting the video and for providing the blank data to a CRT to erase the OSD.

In another aspect of the present invention, a method of controlling an OSD in muting video signals includes the steps of: checking for the presence of a variation in horizontal and vertical sync signals; if there is a variation in the horizontal and vertical sync signals, muting the video signals; and erasing a RAM by generating blank data and an OSD control signal which disables the OSD.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF PREFERRED EMBODIMENT

Figure 1:
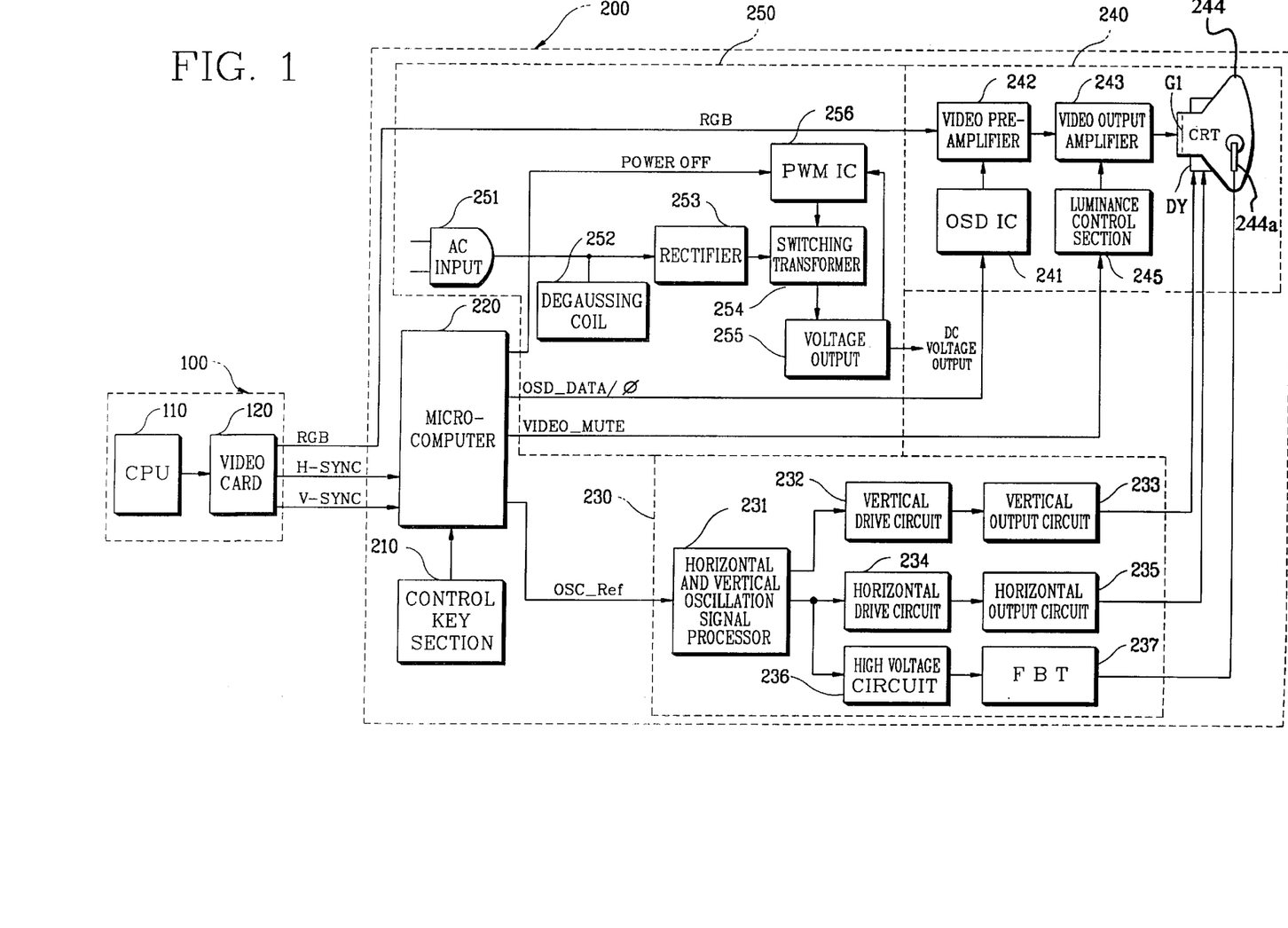
FIG. 1 is a block diagram of the internal circuit of a display monitor.

FIG. 1 is a block diagram showing the internal circuit of a display monitor.

As shown in FIG. 1, computer 100 is composed of a CPU 110 for executing an application program in response to a key signal input by the user so as to generate output data, and a video card 120 for processing the output data of the CPU 10 to provide video signals RGB and horizontal and vertical sync signals H-SYNC and V-SYNC, respectively, which are used to synchronize the video signals RGB.

Display monitor 200, which is used to display the video signals RGB generated by the video card 120 in the computer 100, comprises: a control key section 210 for generating a key signal to adjust the image on the screen and control the functions of the display monitor 200; a microcomputer 220 responsive to the horizontal and vertical sync signals H-SYNC and V-SYNC, respectively, generated by the video card 120 for generating a reference oscillating signal OSC Ref with the gain of the image adjusting signal regulated, OSD data OSD_DATA, blank data φ, and a video mute signal VIDEO_MUTE according to the key signal generated by the key control section 210; a horizontal/vertical output circuit section 230 responsive to the reference oscillating signal generated by the microcomputer 220 to synchronize the video signals RGB; a video circuit section 240 for boosting the video signals RGB generated by the video card 120 or the OSD data OSD data and for displaying them; and a power supply circuit section 250 for supplying a drive voltage to microcomputer 210, horizontal/vertical output circuit section 230 and video circuit section 240.

Below is given a detailed description of the respective blocks in the display monitor 200, as described above.

Horizontal and vertical sync signals H-SYNC and V-SYNC, respectively, generated by the video card 120 of the computer 100 are fed to the microcomputer 220, which regulates the gain of the image adjusting signal in response to the key signal provided by the control key section 210, and which generates a reference oscillating signal.

Receiving the reference oscillating signal from the microcomputer 220, a horizontal/vertical oscillation signal processor 231 generates horizontal and vertical oscillation pulses to control the switching rate in generating a sawtooth wave in response to the horizontal and vertical sync signals H-SYNC and V-SYNC, respectively, transmitted by the video card 120.

A vertical drive circuit 232 boosts the vertical oscillating pulse to generate a drive current. The vertical drive circuit 232 is most widely implemented by single step vertical amplification type and emitter follower type amplifiers. The emitter follower type has the base of a transistor therein used as an input and the emitter thereof used as an output.

Hence, the vertical drive circuit 232 normally performs an operation for the improvement of linearity rather than gain. Such a vertical drive circuit 232 supplies the amplified drive current to a vertical output circuit 233, which generates a sawtooth current in accordance with the vertical sync pulse flowing through a deflection yoke DY, determining a vertical scanning period.

On the other hand, a horizontal drive circuit 234 is receptive to a horizontal oscillating signal generated by the horizontal/vertical oscillating signal processor 231 and, accordingly, generates a drive current sufficient to turn on/off the horizontal output circuit 235. Under the drive current supplied by the horizontal drive circuit 234, the horizontal output circuit 235 provides a sawtooth current to the deflection yoke DY and determines a horizontal scanning period.

Such a horizontal drive circuit 234 may be divided into two classes by virtue of drive mode: an in-phase type wherein the output is turned ON when the drive terminal is ON, and an out-of-phase type wherein the output is OFF when the drive terminal is ON.

In order to supply a stable DC voltage to anode 244a of a CRT 244, a high-voltage circuit 236 and an FBT (FlyBack Transformer) 237 generate a high voltage according to the horizontal pulse provided by the horizontal/vertical oscillation signal processor 231. The generated high voltage is applied to the anode 244a of the CRT 244 so as to form a high voltage across the anodic surface of the CRT 244, controlling the projecting rate of the electron beams and the luminance.

Video pre-amplifier 242 of the video circuit section 240 receives video signals RGB generated by the video card 120 and scanned according to the periods of the horizontal and vertical sawtooth currents generated by the deflection yoke DY in the CRT 244. It functions as a low-voltage amplifier that boosts the low-level video signals RGB to a limited voltage level.

For example, a signal of less than 1 peak to peak voltage (hereinafter, referred to as $V_{pp}$) is boosted to a signal of 4 to 6 $V_{pp}$. A video output amplifier 243 further boosts the video signals RGB of 4 to 6 $V_{pp}$ to those of 40 and 60 $V_{pp}$, supplying energy to the respective pixels of the CRT 244 so as to display an image.

An alternating current (hereinafter, referred to as "AC") is provided to an AC input terminal 251 of the power supply circuit section 250, which provides a drive voltage for displaying the video signals RGB on the screen of the display monitor 200. The AC is applied to a degaussing coil 252 so as to troubleshoot the fuzzy indistinct colors caused by the influence of the earth magnetic field or the external environment.

The AC is normally rectified into a direct current (DC) by a rectifier 253 and the DC is provided to a switching transformer 254. The switching transformer 254 supplies various drive voltages required in the display monitor 200 to a voltage output 255. PWM (Pulse Width Modulation) IC 256 detects errors in the drive voltage generated by the voltage output 255.

PWM IC 256 controls the switching time in transformer 254 according to the detected errors so as to stabilize the output voltage generated by the voltage output 255. If there are no horizontal and vertical sync signals H-SYNC and V-SYNC, respectively, provided to the microcomputer 220, a power-off signal POWER OFF is provided by the microcomputer 220 to PWM IC 256 which interrupts the secondary terminal of the switching transformer 254 so as to reduce the power consumption.

Once the user chooses an OSD function with the control key section 210 in accordance with the normal horizontal and vertical sync signals H-SYNC and V-SYNC, respectively, provided to the microcomputer 220, the microcomputer 220 generates an OSD data OSD_DATA according to the OSD function selected. An OSD IC 241 processes the OSD data OSD_DATA and thereby generates an OSD gain signal.

The OSD gain signal is boosted to a limited level by video pre-amplifier 242, is further amplified in a video output amplifier 243, and is displayed on the screen of the CRT 244. Hence, the user can see the OSD function displayed on the screen of the CRT 244 so as to control the functions of the display monitor 200.

Figure 2:
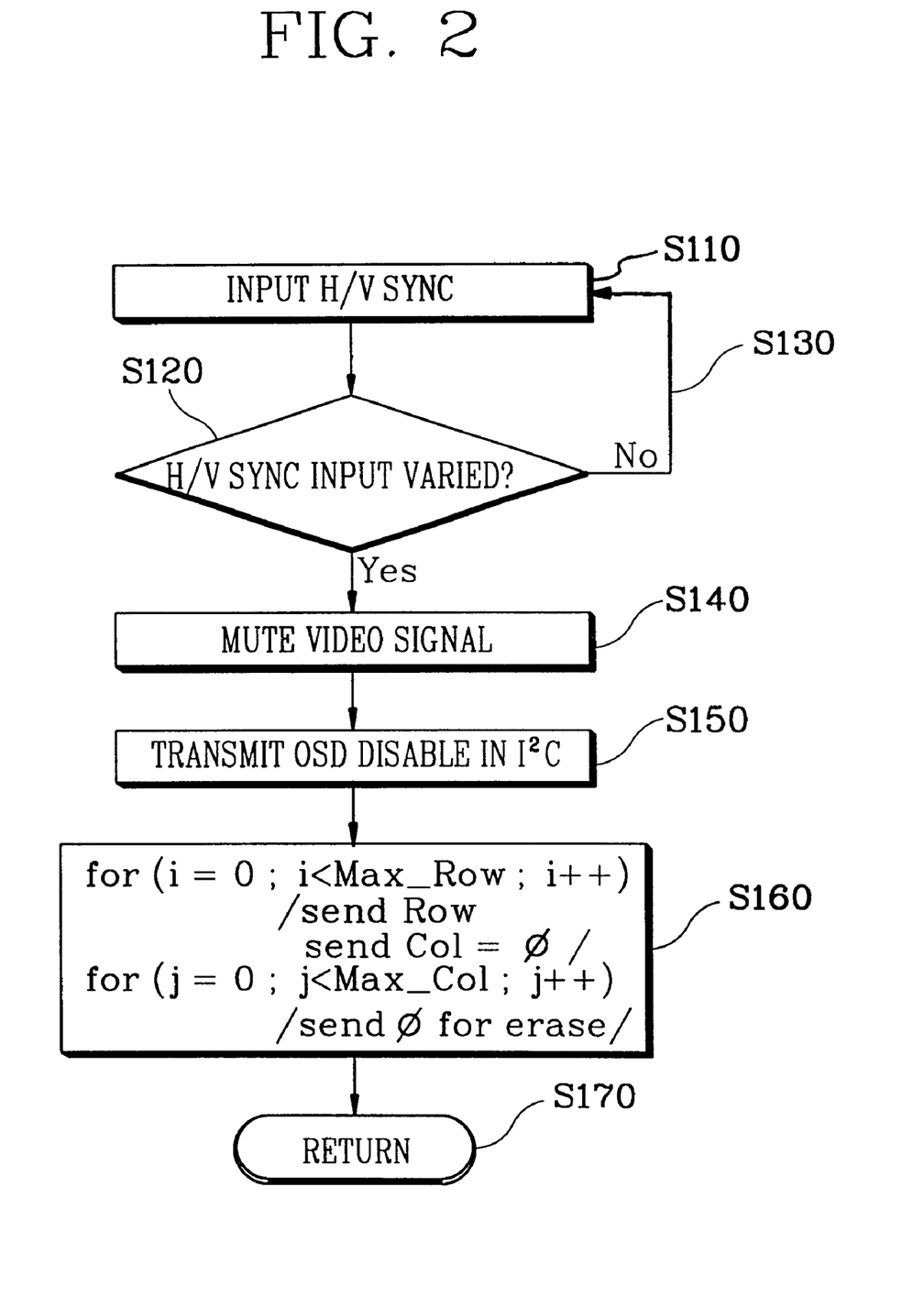
FIG. 2 is a flow chart illustrating a method of erasing an OSD.

FIG. 2 is a detailed diagram illustrating a method of erasing a display according to a video mute function which occurs with the OSD function displayed on the screen.

Referring to FIG. 1 and FIG. 2, the microcomputer 220 receives the horizontal and vertical sync signals H-SYNC and V-SYNC, respectively, in step S110, and checks the variation of the horizontal and vertical sync signals H-SYNC and V-SYNC, respectively, in step S120. If there is no variation in the horizontal and vertical sync signals H-SYNC and V-SYNC, respectively, it returns to step S110 for the receipt of the next horizontal and vertical sync signals H-SYNC and V-SYNC, respectively, via branching step S130.

If there is a variation in the horizontal and vertical sync signals H-SYNC and V-SYNC, respectively, the microcomputer 220 provides a video mute signal VIDEO_MUTE to a luminance control section 245, which via amplifier 243 controls a first grid G1 in the CRT 244 and mutes the video signals RGB displayed on the screen of the CRT 244, in step S140.

In order to erase the OSD on the screen as well as to mute the video signals RGB, the microcomputer 220 sends blank data φ to the OSD IC 241 to disable the OSD, in step 150. That is, the blank data φ is transmitted to the OSD IC 241 under software control so as to save the OSD data in a random access memory (RAM), not shown in the OSD IC 241, in step S160.

The blank data φ saved in the RAM by means of programming language is provided to the CRT 244 via video pre-amplifier 242 and video main amplifier 243 so that the OSD is erased. Then, the microcomputer 220 returns to step S110 for receipt of the next OSD data in step S170.

In the method of erasing the OSD as described above, the blank data is applied through I²C to the OSD IC 241 at a low transmission rate and is saved in the RAM (not shown) of the OSD IC 241 by means of software. This requires much time in erasing the OSD (approximately 200 ms). As a result, data which is partly non-deleted due to noise in erasing the OSD may be displayed on the screen of the display monitor 200.

Figure 3:
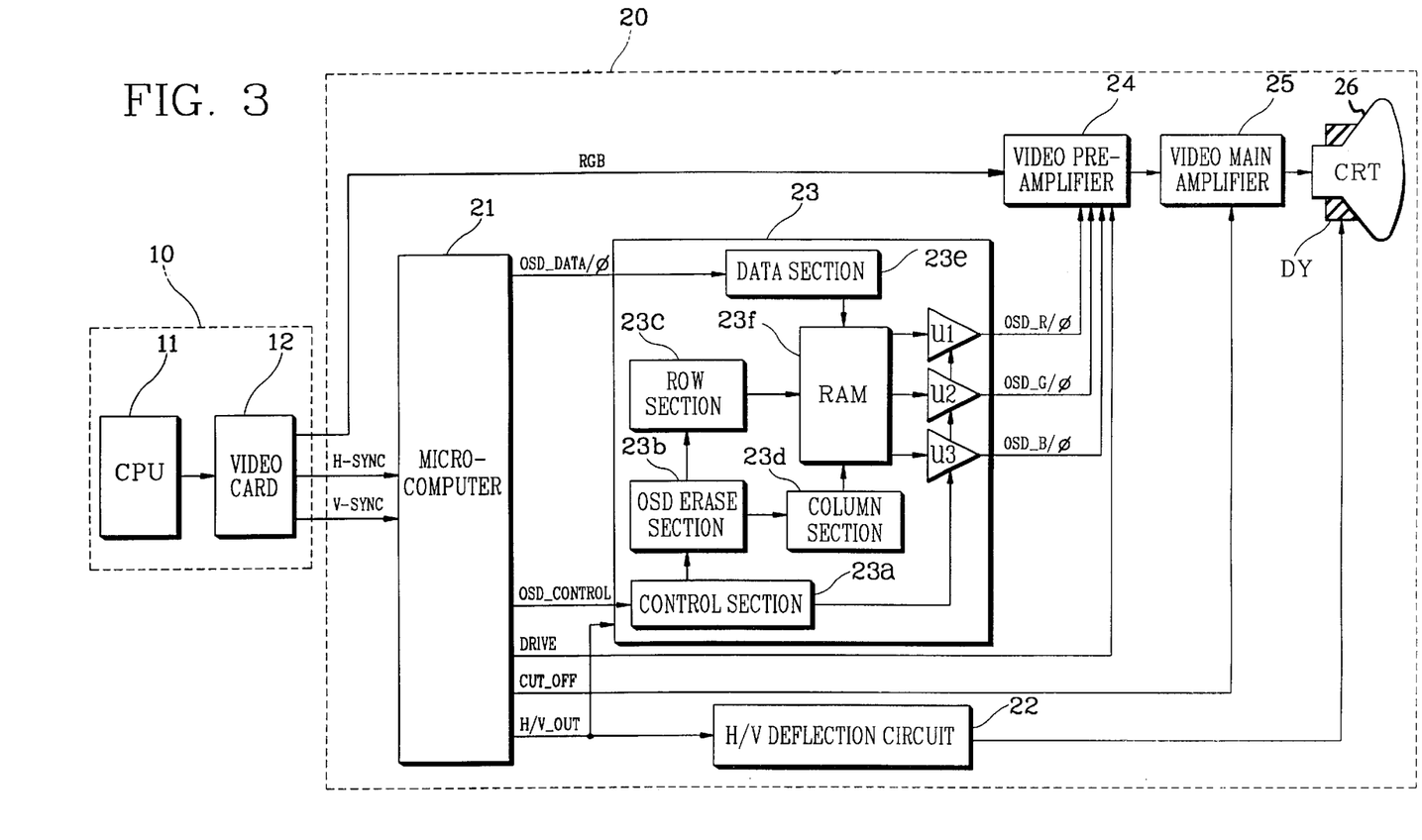
FIG. 3 is a block diagram of the internal circuit of a display monitor in accordance with the present invention.

FIG. 3 is a block diagram of the internal circuit of a display monitor in accordance with the present invention.

As shown in the figure, the display monitor 20 is associated with a computer 10 composed of a CPU 11 for executing an application program in response to a key signal and thereby generating output data, and a video card 12 for processing the output data of the CPU 11 to form video signals RGB, and further generating horizontal and vertical sync signals H-SYNC and V-SYNC. respectively. The display monitor 20 comprises: a microcomputer 21 for processing the horizontal and vertical sync signals H-SYNC and V-SYNC, respectively, received from the video card 12 to generate horizontal and vertical output signals H/V_OUT, for generating OSD data OSD_DATA, an OSD control signal OSD_CONTROL and a drive signal DRIVE when an OSD function is activated, for generating a cut-off signal CUT_OFF for muting the video signals if a variation in the horizontal and vertical sync signals H-SYNC and V-SYNC, respectively, fed thereto is sensed, and for executing a control program for erasing the OSD by generating blank data φ; a horizontal/vertical deflection circuit 22 for processing the horizontal and vertical output signals H/V_OUT generated by the microcomputer 21 so as to generate horizontal and vertical sawtooth currents; an OSD IC 23 for processing the OSD data OSD_DATA in response to the OSD control signal OSD_CONTROL generated by the microcomputer 21 in synchronization with the horizontal and vertical output signals H/V_OUT sent by the microcomputer 21 so as to generate OSD signals (OSD_R, OSD_G, OSD_B), or if there is a variation in the input of the horizontal and vertical sync signals H-SYNC and V-SYNC, respectively, for saving the blank signal φ in a RAM 23f by using an OSD erase section 23b and generating it in response to the OSD control signal OSD_CONTROL; and a video pre-amplifier 24 and a video main amplifier 25 for selectively amplifying the video signals RGB generated by the video card 12 or the OSD signals (OSD_R, OSD_G, OSD_B) generated by the OSD IC 23, and applying the amplified signals to a CRT 26 in response to the drive signal generated from the microcomputer 21 to display them according to the periods of the horizontal and vertical sawtooth current generated by the deflection yoke DY, or muting the video signals RGB in response to the cut-off signal CUT_OFF applied by the microcomputer 21 and erasing the OSD displayed on the screen of the CRT 26 in response to the blank data φ generated by the OSD IC 23.

Figure 4:
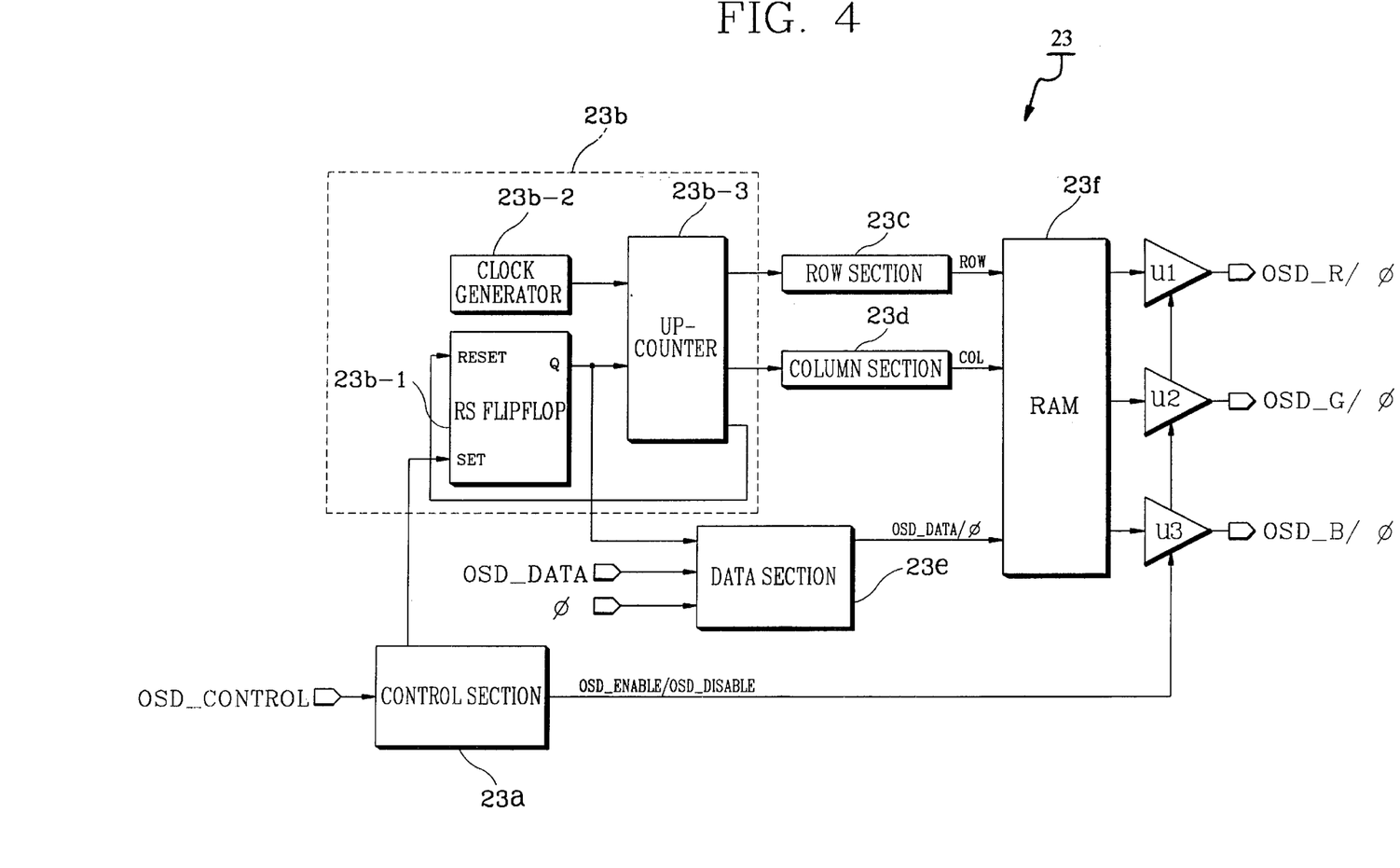
FIG. 4 is a detailed block diagram of the OSD IC shown in FIG. 3.

FIG. 4 is a detailed block diagram of the OSD IC 23 shown in FIG. 3.

As shown in FIG. 4, the OSD IC 23 comprises: a control section 23a for generating an OSD enable signal OSD_ENABLE or OSD disable signal OSD_DISABLE in response to the OSD control signal OSD_CONTROL generated by the microcomputer 21 when the user selects an OSD function, and a set pulse generated according to the OSD enable signal OSD_ENABLE or OSD disable signal OSD_DISABLE; an OSD erase section 23b responsive to the set pulse generated by the control section 23a for counting a clock having a specified period to generate a clock signal; a row section 23c responsive to the clock counted by the OSD erase section 23b for generating a row address to be set; a column section 23d responsive to the clock counted by the OSD erase section 23b for generating a column address to be set; a data section 23e functioning as a buffer to temporarily save the OSD data OSD_DATA and the blank data φ generated by the microcomputer 21; and a RAM 23f for selecting the OSD data OSD_DATA or the blank data φ generated by the microcomputer 21 according to the OSD control signal OSD_CONTROL so as to temporarily save the OSD data OSD_DATA or the blank data φ saved in the data section 23e according to the row and column addresses generated by the row and column sections 23c and 23d, respectively, and generating the OSD signals (OSD_R, OSD_G, OSD_B) or the blank data φ through first, second and third buffer ICs U1, U2 and U3, respectively, according to the OSD enable signal OSD_ENABLE or OSD disable signal OSD_DISABLE generated by the control section 23a.

The OSD erase section 23b comprises: an RS flipflop 23b-1 responsive to the set pulse generated by the control section 23a for generating an inverted signal; a clock generator 23b-2 for generating a clock pulse having a specified period; and an up-counter 23b-3 which is initialized in response to the inverted signal generated by the RS flipflop 23b-1 and which counts the clock pulses of a specified period supplied by the clock generator 23b-2.

The construction of the OSD erase control program saved in the microcomputer 21 to control the OSD IC 23 will be described below with reference to FIG. 5.

Figure 5:
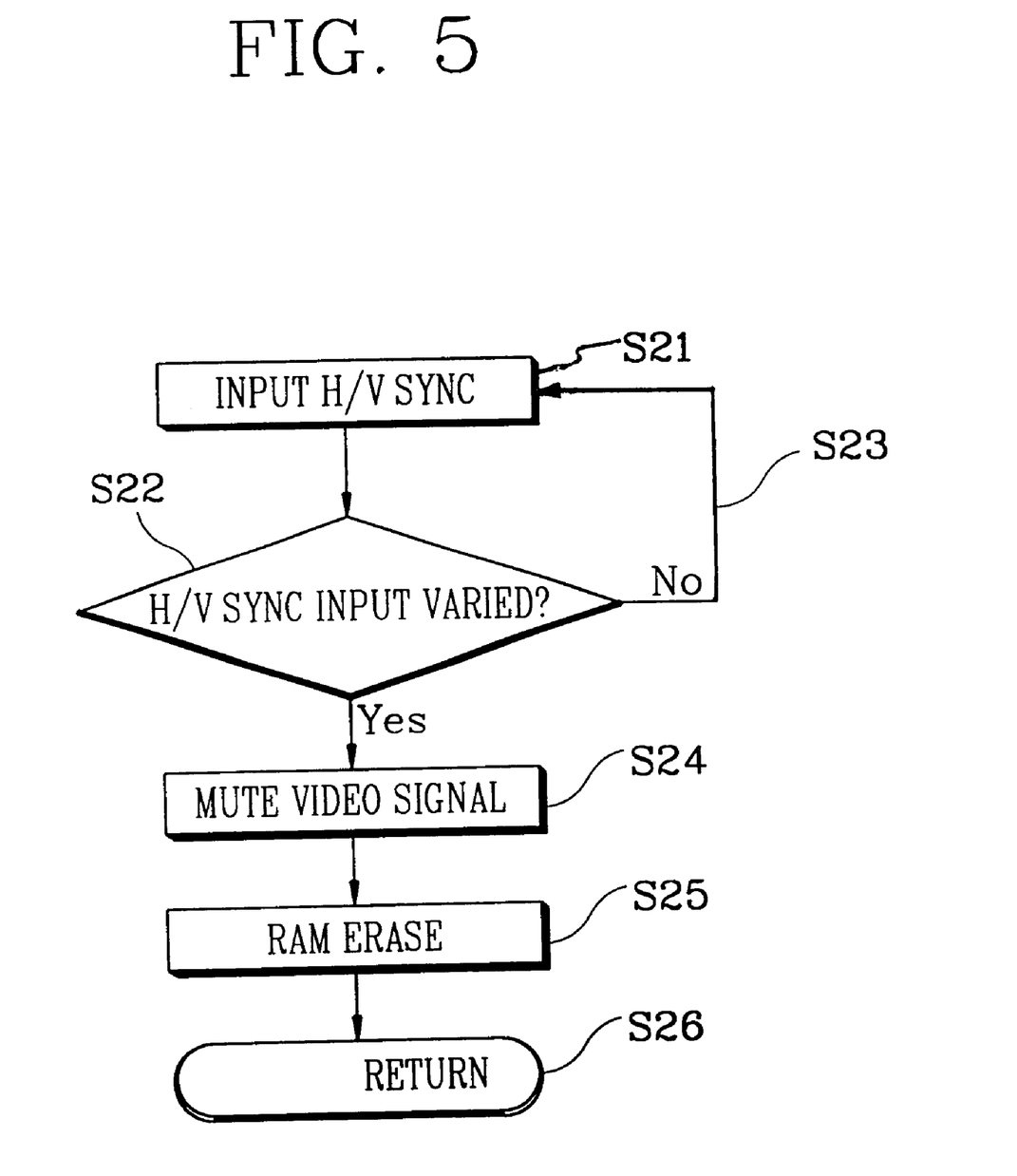
FIG. 5 is a flow chart illustrating a method of erasing an OSD in accordance with the present invention.

FIG. 5 is a flow chart illustrating a method of erasing an OSD in accordance with the present invention. As shown in the figure, the method includes the steps of: (S21) applying horizontal and vertical sync signals H-SYNC and V-SYNC, respectively, to the microcomputer 21; (S22) checking the variation in the horizontal and vertical sync signals H-SYNC and V-SYNC, respectively,; (S23) if there is no variation in the horizontal and vertical sync signals H-SYNC and V-SYNC, respectively, returning to step S21 for the receipt of the next horizontal and vertical sync signals H-SYNC and V-SYNC, respectively; (S24) if variation in the horizontal and vertical sync signals H-SYNC and V-SYNC, respectively, is detected in step S22, muting video signals RGB; (S25) once the video signals RGB are muted in step S24, generating blank data φ and an OSD control signal OSD_CONTROL to disable an OSD, and filling the RAM 23f with the blank data φ; (S26) once the RAM 23f is filled with the blank data φ in step S25 and the horizontal and vertical sync signals H-SYNC and V-SYNC, respectively, are provided to the microcomputer 21 without errors, returning to step S21 for the receipt of the next OSD data OSD_DATA.

Below is given a more detailed description of the OSD controlling device of the construction and its method.

Once an application program runs through the CPU 11 in the computer 10 (FIG. 3), output data is generated and processed to form video signals RGB in the video card 12. The video card 12 also generates horizontal and vertical sync signals H-SYNC and V-SYNC, respectively, which synchronize the video signals RGB.

The horizontal and vertical sync signals H-SYNC and V-SYNC, respectively, are provided to the microcomputer 21 of the display monitor 20 in step S21. The microcomputer 21 checks for variation in the horizontal and vertical sync signals H-SYNC and V-SYNC, respectively, applied thereto in step S22. If there is no variation, the microcomputer 21 generates horizontal and vertical output signals H/V_OUT according to the horizontal and vertical sync signals H-SYNC and V-SYNC, respectively.

The horizontal and vertical output signals H/V_OUT are processed in the horizontal/vertical deflection circuit 22, which provides horizontal and vertical sawtooth currents to a deflection yoke DY, determining the horizontal and vertical scanning periods of the video signals RGB. The video signals RGB generated by the video card 12 are boosted in video pre-amplifier 24 and video main amplifier 25, and then applied to the CRT 26.

In this manner, the video signals RGB in the CRT 26 are scanned according to the periods of the horizontal and vertical sawtooth currents generated by the deflection yoke DY, creating a visual picture on the screen of the CRT 26. Once the user chooses an OSD key (not shown), the microcomputer 21 generates an OSD data OSD_DATA in order to display the OSD.

The OSD data OSD_DATA generated by the microcomputer 21 is applied to the data section 23e in the OSD IC 23. An OSD control signal OSD_CONTROL corresponding to the OSD enable command is also generated for the control of the OSD data OSD_DATA, and is applied to the control section 23a.

The control section 23a generates an OSD enable signal OSD_ENABLE in response to the OSD control signal OSD_CONTROL, and applies a set pulse to the RS flipflop 23b-1 in the OSD erase section 23b. The RS flipflop 23b-1 generates an inverted signal at its output port Q in response to the set pulse applied thereto.

The up-counter 23b-3 is initialized in response to the inverted signal generated by the RS flipflop 23b-1, and counts the clock pulses of a specified period generated by the clock generator 23b-2 so that the row and column sections 23c and 23d, respectively, generate row and column signals ROW and COLUMN, respectively. The OSD data OSD-DATA applied to the data section 23e in response to the row and column signals ROW and COLUMN, respectively, fills the RAM 23f.

Once the RAM 23f is filled with the OSD data OSD_DATA, the first, second and third buffers ICs U1, U2 and U3, respectively, generate OSD signals (OSD_R, OSD_B, OSD_G) according to the OSD enable signal OSD_ENABLE generated by the control section 23a, and apply them to the video pre-amplifier 24.

The OSD signals (OSD_R, OSD_B, OSD_G) are boosted to a limited level by the video pre-amplifier 24 according to a drive signal DRIVE provided by the microcomputer 21, and are further boosted to a sufficient degree in the video main amplifier 25, displaying an OSD on the screen of the CRT 26. From the OSD displayed, the user can control the functions of the display monitor 20 or adjust the picture for execution of a desired operation.

As the OSD is displayed on the screen of the CRT 26, a determination is made in step S22 as to whether or not the inputs of the horizontal and vertical sync signals H-SYNC and V-SYNC, respectively, provided to the microcomputer 21 are varied. With a normal input of the horizontal and vertical sync signals H-SYNC and V-SYNC, respectively, the microcomputer 21 returns to step S21 for the receipt of the next horizontal and vertical sync signals H-SYNC and V-SYNC, respectively, in step S23.

If there is a variation in the horizontal and vertical sync signals H-SYNC and V-SYNC, respectively, in step S22, the microcomputer 21 mutes the video signals RGB in step S24. That is, the microcomputer 21 senses the variation of the horizontal and vertical sync signals applied thereto and generates a cut-off signal CUT_OFF.

The cut-off signal CUT-OFF is applied to the video pre-amplifier 24 to mute the video signals RGB. Simultaneously, the microcomputer 21 runs the OSD erase control program, and thereby generates an OSD control signal OSD_CONTROL and blank data φ according to a command to erase the RAM 23f.

In response to the OSD control signal OSD_CONTROL, which is generated by the microcomputer 21 as a command to erase the RAM 23f, the control section 23a in the OSD IC 23 generates a set pulse and an OSD disable signal OSD_DISABLE. The set pulse generated by the control section 21a is applied to a set port SET of the RS flipflop 23b-1 in the OSD erase section 23b.

The RS flipflop 23b-1 is responsive to the set pulse to apply the inverted signal to the up-counter 23b-3 which is initialized. The up-counter 23b-3 counts the clock pulses of a specified period which are supplied by the clock generator 23b-2, and controls the row and column sections 23c and 23d, respectively, to generate row and column signals ROW and COLUMN, respectively.

In response to the row and column signals ROW and COLUMN, respectively, the data section 23e fills the RAM 23f with the blank data φ generated by the microcomputer 21. When the blank data φ fills the whole RAM 23f, the first, second and third buffers IC U1, U2 and U3, respectively, generate the blank data φ in response to the OSD disable signal OSD_DISABLE generated by the control section 23a.

The blank data φ is then applied to the CRT 26 via the video pre-amplifier 24 and video main amplifier 25 so that the OSD is filled with the blank signal φ and erased in step S25.

Once the blank data φ fills the RAM 23f to erase the OSD, the microcomputer 21 returns to step S21 for the receipt of the next horizontal and vertical sync signals H-SYNC and V-SYNC, respectively, in step S26. Then, an overflow occurs in the up-counter 23b-3 to apply a clock pulse to a reset port RESET in the RS flipflop 23b-1. The RS flipflop 23b-1 initializes the up-counter 23b-1 which counts to generate the clock pulse and fills the RAM 23f in response to the OSD data OSD_DATA applied by the microcomputer 21, displaying an OSD on the screen of the CRT 26.

The use of the OSD erase section 23b and the OSD erase control program reduces the time required for erasing an OSD by up to approximately 30 µs so that the after-image of the OSD in muting the video signals RGB can be prevented in step S25.

In the present invention as described above, the use of both hardware and software to erase an OSD makes it possible to prevent an after-image of the OSD from occurring in muting the video signals in a display monitor having an OSD function.

It will be apparent to those skilled in the art that various modifications and variations can be made in the device for and method of controlling an OSD in muting video signals according to the present invention without departing from the spirit or scope of the invention. Thus, it is intended that the present invention cover the modifications and variations of this invention provided they come within the scope of the appended claims and their equivalents.

What is claimed is:

1. A device for controlling an on-screen display(OSD) in muting video signals on a cathode ray tube (CRT), comprising:

microcomputer means for generating a cut-off signal to mute the video signals upon sensing a variation in horizontal and vertical sync signals provided thereto from a video card, and for generating a cut-off signal to mute the video signals upon sensing a variation in horizontal and vertical sync signals provided thereto from a video card, for generating an OSD control signal, and for generating blank data by executing an OSD erase control program for erasing the OSD;

OSD integrated circuit (IC) means including a data section responsive to the blank data and a control section responsive to the OSD control signal when the variation in the horizontal and vertical sync signals provided to the microcomputer means is sensed for erasing the OSD; and amplifier means responsive to the cut-off signal generated by the microcomputer means for muting the video signals.

2. The device as defined in claim 1, wherein the control section is responsive to the OSD control signal generated by the microcomputer means for generating an OSD disable signal and a set pulse according to the OSD disable signal.

3. The device as defined in claim 2, wherein said OSD IC means further comprises an OSD erase section which is initialized in response to the set pulse generated by the control section and which counts a clock having a specified period to generate a clock signal.

4. The device as defined in claim 3, wherein said OSD IC means further comprises:

a row section responsive to the clock counted by the OSD erase section for generating a row signal to set a row address; and a column section responsive to the clock counted by the OSD erase section for generating a column signal to set a column address.

5. The device as defined in claim 4, wherein said OSD IC means further comprises a random access memory (RAM) for selectively receiving the blank data from the data section in response to the OSD control signal generated by the microcomputer means and for saving said blank data according to the row and column addresses generated by the row and column sections, respectively, and for generating the blank data therein in response to the OSD disable signal generated by the control section.

6. The device as defined in claim 3 wherein the OSD erase section comprises:

an RS flipflop responsive to the set pulse generated by the control section for generating an inverted signal;

a clock generator for generating clock pulses having a specified period; and an up-counter initialized in response to the inverted signal generated by the RS flipflop, and counting the clock pulses having the specified period as supplied by the clock generator.

7. The device as defined in claim 1, wherein said data section functions as a buffer for temporarily saving the blank data from the microcomputer means.

8. A method of controlling an on-screen display (OSD) in muting video signals, comprising the steps of:

providing an OSD integrated circuit (IC) which includes a data section and an OSD erase section;

checking for presence of a variation in horizontal and vertical sync signals;

responding to a variation in the horizontal and vertical sync signals by muting the video signals;

generating blank data and an OSD control signal which disables the OSD; and operating said data section in response to said blank data and said OSD erase section in response to said OSD control signal so as to erase a random access memory (RAM).

9. The method as defined in claim 8, further comprising the step of:

when there is not a variation in the horizontal and vertical sync signals, receiving further horizontal and vertical sync signals, and checking for the presence of a variation in the further horizontal and vertical sync signals.

10. The method as defined in claim 8 further comprising the step of receiving further horizontal and vertical sync signals as an input, and repeating the step of checking for the presence of a variation in the horizontal and vertical sync signals.

11. The method as defined in claim 8 wherein said OSD IC includes a control section which generates a set pulse, and wherein said OSD erase section is initialized in response to the set pulse and counts a clock having a specified period to generate a clock signal.

12. A device for controlling an on-screen display (OSD) in muting video signals, comprising:

determining means for determining whether there is a variation in horizontal and vertical sync signals;

muting means responsive to said determining means determining that there is a variation in the the horizontal and vertical sync signals for muting the video signals;

random access memory (RAM) means for storing OSD data; and erasing means responsive to said determining means determining that there is a variation in the horizontal and vertical sync signals, and including a data section responsive to blank data and a control section responsive to an OSD control signal for erasing said RAM means, thereby disabling the OSD.

13. The device as defined in claim 12, wherein said determining means comprises a microcomputer.

14. The device as defined in claim 13, wherein said microcomputer generates a cut-off signal to mute the video signals upon determining that there is a variation in the horizontal and vertical sync signals.

15. The device as defined in claim 13, wherein said microcomputer generates said blank data by executing an OSD erase control program stored in said microcomputer.

16. The device as defined in claim 12, wherein said erasing means comprises an OSD integrated circuit (IC) for saving the blank data in said random access memory means when it is determined that there is a variation in the horizontal and vertical sync signals, said blank data being generated in accordance with the OSD control signal.

17. The device as defined in claim 12, wherein said microcomputer generates a cut-off signal to mute the video signals when it is determined that there is a variation in the horizontal and vertical sync signals;

said device further comprising amplifier means responsive to the cut-off signal generated by said microcomputer for muting the video signals.

18. The device as defined in claim 17, further comprising a video pre-amplifier responsive to control inputs for pre-amplifying the video signals to produce a pre-amplifier output, and a video main amplifier responsive to a further control input for amplifying the pre-amplifier output of said video pre-amplifier to provide an amplified output for display.

19. The device as defined in claim 18, further comprising means for generating said control inputs to said video pre-amplifier.

20. The device as defined in claim 18, wherein said further control input to said video main amplifier is generated by said determining means when it is determined that there is a variation in the horizontal and vertical sync signals.

21. The device as claimed in claim 12, wherein said erasing means comprises a clock generator for generating clock pulses having a specified period, and an up-counter for counting the clock pulses having the specified period as generated by the clock generator.

22. The device as defined in claim 12, wherein said control section generates a set pulse, and wherein said erasing means further comprises an OSD erase section which is initialized in response to the set pulse and counts a clock having a specified period to generate a clock signal.

23. The device as defined in claim 22, wherein said erasing means further comprises:

a row section responsive to the clock counted by the OSD erase section for generating a row signal to set a row address; and a column section responsive to the clock counted by the OSD erase section for generating a column signal to set a column address.

24. The device as defined in claim 23, wherein said erasing means further comprises a random access memory (RAM) for selectively receiving the blank data from the data section in response to the OSD control signal generated by the microcomputer means and for saving said blank data according to the row and column addresses generated by the row and column sections, respectively, and for generating the blank data saved therein in response to the OSD disable signal generated by the control section.

25. A device for controlling an on-screen display (OSD) in muting video signals, comprising:

determining means for determining whether there is a variation in horizontal and vertical sync signals;

muting means responsive to said determining means determining that there is a variation in the horizontal and vertical sync signals for muting the video signals;

random access memory (RAM) means for storing OSD data;

erasing means responsive to said determining means determining that there is a variation in the horizontal and vertical sync signals, and to blank data and an OSD control signal, for erasing said RAM means, thereby disabling the OSD;

means for saving the blank data in said random access memory means when it is determined that there is a variation in the horizontal and vertical sync signals, the blank data being generated in accordance with the OSD control signal; and a control section responsive to the OSD control signal for generating an OSD disable signal and a set pulse in accordance with the OSD disable signal.

26. The device as defined in claim 25, wherein said erasing means comprises an OSD erase section initialized in response to the set pulse generated by the control section and counting a clock having a specified period to generate a clock signal.

27. The device as defined in claim 26, wherein said erasing means further comprises:

a row section responsive to the clock counted by the OSD erase section for generating a row signal to set a row address; and a column section responsive to the clock counted by the OSD erase section for generating a column signal to set a column address.

28. The device as defined in claim 27, wherein said erasing means further comprises a data section functioning as a buffer for temporarily saving the blank data.

29. The device as defined in claim 28, wherein said random access memory means selectively receives the blank data from the data section in response to the OSD control signal, and wherein said blank data is saved in accordance with the row and column addresses generated by the row and column sections, respectively.

30. The device as defined in claim 29, wherein said random access memory means generates the blank data saved therein in response to the OSD disable signal generated by the control section.

31. The device as defined in claim 25, wherein said erasing means comprises an erase section comprising a flipflop responsive to the set pulse generated by the control section for generating an inverted signal.

32. The device as defined in claim 31, wherein said erase section further comprises a clock generator for generating clock pulses having a specified period, and an up-counter initialized in response to the inverted signal generated by said flipflop for counting the clock pulses having the specified period as generated by the clock generator.

33. The device as defined in claim 25, wherein said erasing means comprises an erase section including a clock generator for generating clock pulses having a specified period, and an up-counter for counting the clock pulses having the specified period as generated by the clock generator.

34. A device for controlling an on-screen display (OSD) in muting video signals, comprising:

determining means for determining whether there is a variation in horizontal and vertical sync signals;

muting means responsive to said determining means determining that there is a variation in the horizontal and vertical sync signals for muting the video signals;

random access memory (RAM) means for storing OSD data; and erasing means responsive to said determining means determining that there is a variation in the horizontal and vertical sync signals, and to blank data and an OSD control signal, for erasing said RAM means, thereby disabling the OSD, wherein said erasing means comprises a flipflop responsive to a set pulse for generating an inverted signal.

35. The device as claimed in claim 34, wherein said erasing means further comprises a clock generator for generating clock pulses having a specified period, and an up-counter initialized in response to the inverted signal generated by said flipflop for counting the clock pulses having the specified period as generated by the clock generator.

* * * * *